United States Patent
Koshida

(10) Patent No.: US 6,897,604 B2
(45) Date of Patent: May 24, 2005

(54) METHOD OF GENERATING BALLISTIC ELECTRONS AND BALLISTIC ELECTRON SOLID SEMICONDUCTOR ELEMENT AND LIGHT EMITTING ELEMENT AND DISPLAY DEVICE

(75) Inventor: Nobuyoshi Koshida, Tokyo (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 10/239,418

(22) PCT Filed: Mar. 26, 2001

(86) PCT No.: PCT/JP01/02415

§ 371 (c)(1),
(2), (4) Date: Nov. 25, 2002

(87) PCT Pub. No.: WO01/71759

PCT Pub. Date: Sep. 27, 2001

(65) Prior Publication Data

US 2004/0085011 A1 May 6, 2004

(30) Foreign Application Priority Data

Mar. 24, 2000 (JP) .................................... 2000-085417

(51) Int. Cl.⁷ .............................................. H01L 33/00
(52) U.S. Cl. ........................ 313/311; 445/51; 313/310
(58) Field of Search ................. 313/495–497, 313/422, 500, 311, 310, 509; 315/169.4; 345/75.2; 445/50, 51, 24

(56) References Cited

U.S. PATENT DOCUMENTS

| | | | |
|---|---|---|---|
| 5,329,207 A | * 7/1994 | Cathey et al. | 315/169.1 |
| 5,990,605 A | * 11/1999 | Yoshikawa et al. | 313/310 |
| 6,472,803 B1 | * 10/2002 | Yoshizawa et al. | 313/310 |
| 6,603,257 B1 | * 8/2003 | Hasan et al. | 313/496 |

FOREIGN PATENT DOCUMENTS

| | | | | |
|---|---|---|---|---|
| JP | 10269932 A | * 10/1998 | | H01J/1/30 |
| JP | 2000-57935 | 2/2000 | | |

OTHER PUBLICATIONS

T. Komoda, et al., "Mechanism of efficient and stable surface–emitting cold cathode based on porous polycrystalline films", Journal of Vacuum Science of Technology B, vol. 17, No. 3, pp. 1076 to 1079, May/Jun. 1999.

* cited by examiner

Primary Examiner—Vip Patel
Assistant Examiner—Glenn Zimmerman
(74) Attorney, Agent, or Firm—Wenderoth, Lind & Ponack, L.L.P.

(57) ABSTRACT

A method of generating ballistic electrons with a high controllability by applying an electric field to a nano-structure micro-crystal layer or a semi-insulating layer of a semiconductor to generate ballistic electrons or quasiballistic electrons by a multiple-tunnel effect; and a semiconductor device used in this method and provided with a practical material constitution.

3 Claims, 10 Drawing Sheets

METHOD OF GENERATING BALLISTIC ELECTRONS AND BALLISTIC ELECTRON SOLID SEMICONDUCTOR ELEMENT AND LIGHT EMITTING ELEMENT AND DISPLAY DEVICE

TECHNICAL FIELD

The present invention relates to a ballistic-electron solid-state semiconductor device. More particularly, the present invention relates to a ballistic-electron solid-state semiconductor device for realizing ballistic conduction in which the drift length in a semiconductor extremely increases under a high electric field and using generated ballistic electrons as an excitation source.

BACKGROUND ART

It is known that electrons travel without being scattered and behave like electrons in a vacuum by decreasing the size of a semiconductor up to a dimensional region smaller than the mean free path of electrons in the semiconductor. The conduction electrons are referred to as ballistic electrons that can travel without being scattered or with no loss even in a solid differently from normal conduction electrons based on drift or diffusion.

Because it is estimated that the semiconductor device technology is greatly innovated when ballistic electrons can be obtained at a high controllability, various studies about characteristics of ballistic electrons in the nanostructure of a semiconductor have been performed so far. However, most of the studies remain at physical observation under a very restricted condition such as a specific single structure or very low temperature and thus, they have not resulted in the industrial device development. To generate ballistic electrons for practical use, studies on material configurations and the material process technology are indispensable. However, it is the present state that there is almost no research or development obtaining excellent results from the above viewpoint.

A CRT (Cathode Ray Tube) and a fluorescent-character display tube are widely practically used as self-light-emitting display devices. These devices respectively conform to an operation principle of accelerating ejected electrons in vacuum by an electric field and excitating the fluorescent material coated on an opposite screen. Therefore, it is indispensable to include a vacuum tube having a certain volume or more for configuration. Therefore, this has been a large fault against decrease of a device in thickness or increase of the device in size.

Moreover, other self-light-emitting display devices include a display device using an EL element made of an inorganic or organic material and a plasma display.

The display device using the EL element conforms to an operation principle of accelerating carriers in a solid and collision-exciting the emission center. Therefore, the emission quantum efficiency is restricted to a limited value by an energy loss in the photon conversion of carriers in the solid and therefore, heat generation in the element is unavoidable. Therefore, to increase a display device in size, actions for deterioration of device characteristics due to a temperature rise and for thermal sinking are left as technical problems.

Also concerning a plasma display, restriction of emission due to energy loss under operation is a problem and moreover, the fact that it is difficult to realize small-power driving because of using discharge is left as a problem to be solved.

Thus, a natural-light display device has advantages and disadvantages depending on its type and has many technical subjects such as increase in size, decrease in thickness, and decrease in power consumption. However, when it is possible to obtain the ballistic electrons at a high controllability, it is expected that these technical problems are solved.

The present invention is made to solve the above problems and its object is to provide a method capable of generating ballistic electrons at a high controllability, a semiconductor device having a practical material configuration for the method, and display means using the semiconductor device.

DISCLOSURE OF INVENTION

To solve the above problems, firstly the invention of the present application provides a ballistic-electron generating method comprising a step of applying an electric field to a nanostructure microcrystal layer or semi-insulating layer of a semiconductor in order to cause a multiple-tunnel effect, thereby generating ballistic electrons or forward ballistic electrons.

Secondly, the present invention provides a ballistic-electron generating method wherein the nanostructure microcrystal layer or semi-insulating layer of a semiconductor has an interface oxide film therein. Thirdly, the present invention provides a ballistic-electron generating method wherein the nanostructure microcrystal layer or semi-insulating layer of semiconductor is a porous layer. Fourthly, the invention of the present application provides a ballistic-electron solid-state semiconductor device comprising a nanostructure microcrystal semiconductor layer or a semi-insulating layer formed on the surface of a semiconductor substrate, the layer is capable of generating ballistic electrons or quasiballistic electrons by a multiple-tunnel effect caused by an electric field. Fifthly, the present invention provides a ballistic-electron solid-state semiconductor device in which the nanostructure microcrystal semiconductor layer or the semi-insulating layer has an interface oxide film therein. Sixthly, the present invention provides a ballistic-electron solid-state semiconductor device in which the nanostructure microcrystal semiconductor layer or the semi-insulating layer is a porous layer. Seventhly, the present invention provides a ballistic-electron solid-state semiconductor device which is a porous and formed by anodic oxidation. Eighthly, the present invention provides a ballistic-electron solid-state semiconductor device further comprising a metallic thin-film electrode provided on the nanostructure microcrystal layer or the semi-insulating layer and an ohmic electrode provided on the back of the semiconductor substrate.

Ninthly, the invention of the present application provides a ballistic-electron-exciting solid-state light-emitting device comprising the above ballistic-electron solid-state semiconductor device in which a phosphor layer is deposited between the microcrystal semiconductor layer or the semi-insulating layer and the metallic thin-film electrode or on the metallic thin-film electrode, wherein ballistic electrons are generated from the microcrystal semiconductor layer or the semi-insulating layer and collided directly against the phosphor layer by applying a voltage to the electrode, thereby exciting a phosphor to emit visible light.

Tenthly, the invention of the present application provides a light-emitting display device comprising, as an information display device, the above semiconductor device in which the ohmic electrode and the metallic thin-film electrode are arranged in a segment form or dot form.

Eleventhly, the invention of the present application provides a thin light-emitting display device comprising a plurality of the above light-emitting display devices, wherein the plurality of light-emitting display devices are operated by a simple matrix driving system. Twelfthly, the invention of the present invention provides a thin light-emitting display device comprising a plurality of the above light-emitting display devices on a semiconductor substrate having an active element array formed thereon, wherein the plurality of light-emitting display devices are operated by an active matrix driving system.

Thirteenthly, the invention of the present invention provides a thin light-emitting display device according, wherein the phosphor emits one or more of red light, green light, and blue light. Fourteenthly, the invention of the present invention provides a thin planar display device, wherein image information of any color is displayed.

Furthermore, the present invention provides a image-information display device or an arithmetic processing unit constituted by functionally integrating the above ballistic-electron solid-state semiconductor device with a VLSI.

BEST MODE FOR CARRYING OUT THE INVENTION

Figure 1:
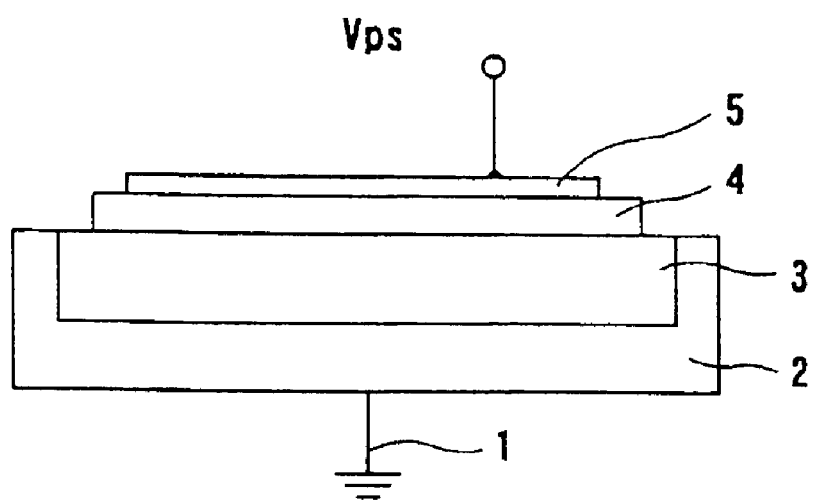
FIG. 1 is a schematic view showing a configuration of a ballistic-electron-exciting solid-state light-emitting device fabricated as an example of the invention of the present application, in which symbol 1 denotes an ohmic electrode, 2 denotes an n-type silicon substrate, 3 and 4 denote PS layers, and 5 denotes $Alq_3$ and an Au thin film.

Embodiments of the invention of the present application having the above features are described below.

In the invention of the present application, an electric field is applied to a nanostructure microcrystal layer or semi-insulating layer of semiconductor to generate ballistic electrons without being scattered or quasiballistic electron hardly being scattered in a solid by a multiple-tunnel effect.

In this case, the nano-structure microcrystal semiconductor layer or insulating layer is a nanostructure microcrystal layer or semi-insulating layer formed by wet process or dry process, and as examples of those layers, a layer having an interface oxide film, a porous layer and the like can be used. More specifically, a structure formed by anodic oxidation of semiconductor can be used.

A basic configuration of the ballistic-electron solid-state semiconductor device of the invention of the present application can be a kind of MIS diode fabricated by applying a wet process or dry process to the surface of a semiconductor substrate having an electrode in order to form a microcrystal semiconductor layer and then depositing a metallic thin-film electrode.

However, in the ballistic-electron solid-state semiconductor device of the invention of the present application, the microcrystal semiconductor layer corresponding to an I layer works more than a mere drift layer. That is, as described above, electrons of the microcrystal semiconductor layer ballistically travel in the microcrystal semiconductor layer under a strong electric field.

For example, when oxidation with structural control is applied to the surface of a silicon substrate, a generated porous silicon (PS) layer is composed of silicon microcrystals (5 nm or less) connected to each other. And when an electric field is applied to this PS layer, the major portion of the electric field is produced not in silicon microcrystal but in a silicon-oxide film at the interface. Because the silicon-oxide film is very thin, quasiballistic electrons passing through microcrystals one after another without being hardly scattered in a strong electric field are produced. Moreover, by applying a strong electric field, a multiple-tunnel process in which electrons pass through microcrystal without being scattered is completed, and as its result, the drift length of electrons becomes a value far exceeding the size of silicon microcrystal and then ballistic electrons are produced. In the case of a PS layer having a thickness of approx. 1 $\mu$m, ballistic electrons are produced by applying a strong electric field.

Anodic oxidation and etching can be applied to the surface of a semiconductor as the wet process. Oxidation, sputtering, and heat treatment can be applied to the surface of a semiconductor substrate as the dry process.

In the ballistic-electron solid-state semiconductor device of the invention of the present application, by applying a positive voltage to the metallic thin-film electrode side of a semiconductor substrate, electrons are injected into a microcrystal semiconductor layer from the silicon-substrate side. For example, by setting the field intensity of a microcrystal semiconductor layer to approx. 105 V/cm, the kinetic energy of a ballistic electron having a drift length of approx. 1 µm reaches 10 eV. Because the electron travels the same as the case in which it is present in a vacuum though it is present in a solid, it has two characteristics such as "variable characteristic of acceleration energy" and "non-loss characteristic of energy". Applications realized by noting these characteristics are described below.

(1) Use of Variability of Electron Acceleration Energy

According to a characteristic that electrons can be accelerated arbitrarily through application of a voltage it is possible to directly collide ballistic electrons generated in a microcrystal semiconductor layer against a phosphor and excite the phosphor through application of a voltage to an electrode and produce visible light by providing a structure in which a phosphor layer made of a phosphor is deposited between a microcrystal semiconductor layer and a metallic thin-film electrode or on the metallic thin-film electrode for the above ballistic-electron solid-state semiconductor device. That is, electrons changed to ballistic electrons in a microcrystal semiconductor through application of a voltage collide with a phosphor between the microcrystal semiconductor layer and a metallic thin-film electrode or on the metallic thin-film electrode at a high speed as hot electrons while obtaining high kinetic energy and the phosphor is excited. As a result, it is possible to emit visible lights having an optional wavelength corresponding to the type of a phosphor. In this case, by controlling an applied voltage, it is possible to control an emission quantity and a ballistic-electron-exciting solid-state light-emitting device not requiring a vacuum is realized. By using a cathode luminescence material for a low voltage for a phosphor, it is possible to obtain a practically-usable emission quantity even if the kinetic energy of generated ballistic electrons is about 10 eV.

(2) Use of Energy Non-Loss

In a ballistic conduction mode, electrons travel in a solid without being scattered. That is, because heat due to electron conduction is not produced, it is possible to realize a state like a vacuum tube in which the operation space and heat-radiation space of a device are separated from each other though the device is solid. Moreover, in the case of a normal semiconductor, after an electron velocity reaches a saturated drift velocity decided by the balance between electron acceleration and photon scattering, it is impossible to accelerate electrons further even if increasing an electric field. Therefore, the operation frequency of a semiconductor device is limited. However, the saturated drift velocity of a ballistic electron is not limited. Therefore, by applying a ballistic-electron solid-state semiconductor device of the invention of the present application, it is possible to realize an electron device to be driven at an ultra-high speed and having an extremely low energy loss.

In the case of a ballistic-electron solid-state semiconductor device of the invention of the present application, it is possible to use any semiconductor as the material of a semiconductor substrate as long as the above wet process or dry process can be applied to the material. For example, it is possible to use single-crystal silicon, polycrystal silicon, and compound semiconductors. Specifically, it is possible to use most of elemental and compound materials in IV group, III-V group, and II-VI group such as germanium (Ge), silicon carbide (SiC), gallium arsenide (GaAs), indium phosphide (InP), and cadmium selenide (CdSe). Moreover, it is possible to use every material in which ballistic conduction can be realized in a strong electric field such as silicon-oxide film.

It is possible to use every organic or inorganic material as a phosphor. Specifically, low-voltage cathode luminescence materials (ZnO:Zn etc) can be used.

In the case of the invention of the present application, it is possible to realize functions of a light-emitting display device by providing a structure in which a phosphor layer made of a phosphor is deposited between a microcrystal semiconductor layer and a metallic thin-film electrode or on the metallic thin-film electrode for the ballistic-electron solid-state semiconductor device as described above. In this case, it is preferable that an ohmic electrode and metallic thin-film electrode provided for a semiconductor substrate are formed like a segment or dot.

Figure 10:
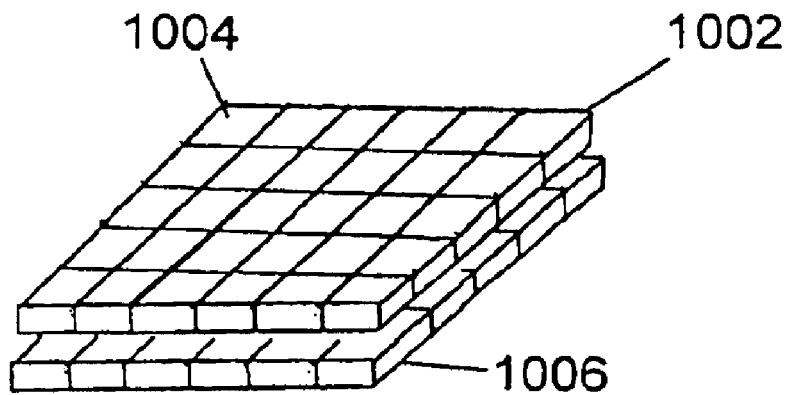
FIG. 10 illustrates a plurality of light-emitting display devices in accordance with the present invention arranged and operated in accordance with a simple matrix driving system.
Figure 11:
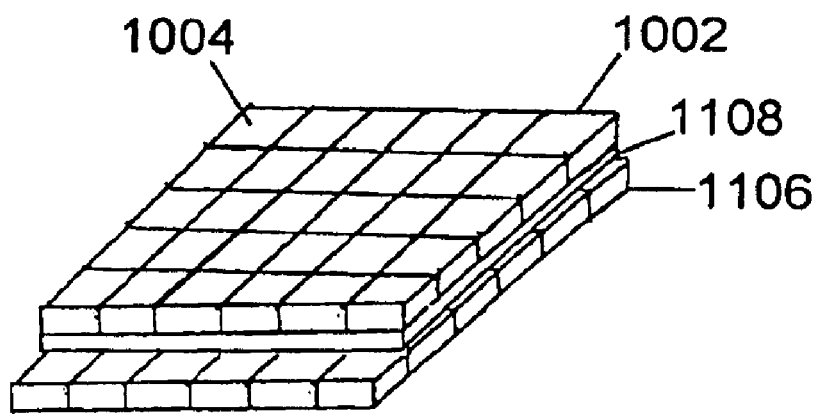
FIG. 11 illustrates a plurality of light-emitting display devices in accordance with the present invention arranged on a semiconductor substrate on which an active device array is formed and which can be operated in accordance with an active matrix driving system.

Moreover, as illustrated in FIG. 10 and FIG. 11, an advanced-performance thin light-emitting display device is realized by arranging a plurality 1002 of the above discussed light-emitting display devices 1004 and operating them in accordance with a simple matrix driving system 1006 or arranging a lot of the above light-emitting display devices on a semiconductor substrate on which an active device array is formed and operating them in accordance with an active matrix driving system 1106.

It is also possible to realize a thin planar display device for outputting video information of any color by using a phosphor for emitting red light, green light, or blue light as a phosphor of the thin light-emitting display device and thereby periodically arranging many of these three colors.

Moreover, by functionally integrating a ballistic-electron solid-state semiconductor device of the invention of the present application with a VLSI, it is possible to realize a video-information display device or an arithmetic processing unit.

The above electron ballistic conduction phenomenon is basically based on injection of electrons from a n-type silicon substrate. However, also in the case of a p-type substrate, it is also possible to generate electrons on a drift layer by the field effect or light irradiation from the outside and make these electrons contribute to operations of a device as ballistic electrons. That is, a ballistic-electron solid-state semiconductor device of the invention of the present application can be also used as a light detection device. Moreover, because generation of ballistic electrons can be modulated or started by external light, it is possible to realize a new optoelectronic operation mode.

Though the invention of the present application has the above features, it is more specifically described below by referring to examples.

EXAMPLES

Example 1

A ballistic-electron-exciting solid-state light-emitting device of the invention of the present application is fabricated and basic characteristics are studied.

Figure 2:
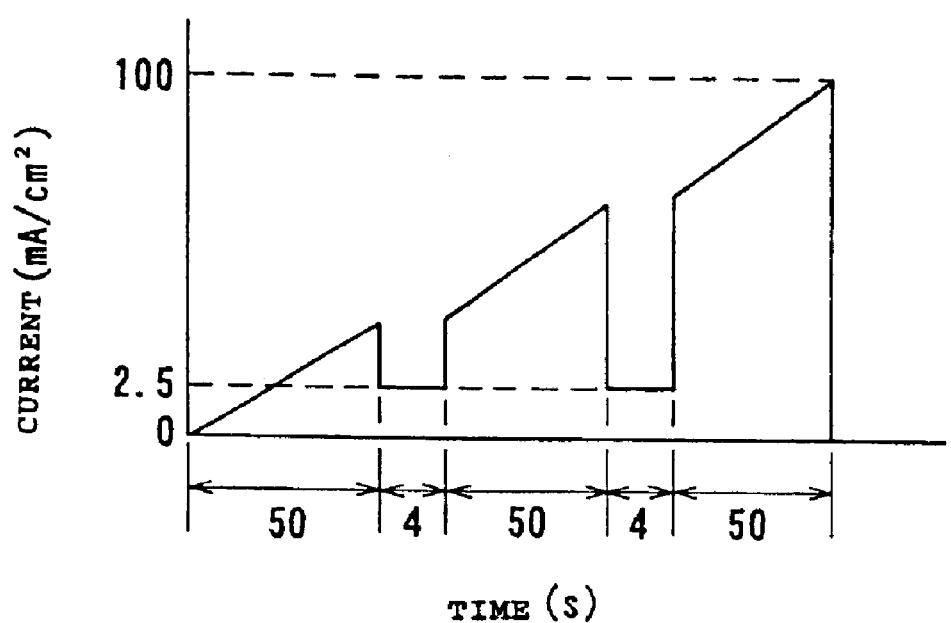
FIG. 2 is a graph showing a time-series change of current control in a PS-layer forming process through anodic oxidation of an example of the invention of the present application.

As shown in FIG. 1, in the case of a fabricated ballistic-electron-exciting solid-state semiconductor device, a PS layer (3) is formed by applying anodic oxidation to the surface of an n-type silicon substrate (2) (resistivity of 0.018 Ωcm) having a orientation (111) on whose back an ohmic electrode (1) is formed in a mixed solution (mixture rate of 1:1) of 50 wt % HF aqueous solution and ethanol under light irradiation using a 500-W tungsten lamp as a light source. In this case, as shown in FIG. 2, the operation of slowly increasing an anodic oxidation current for 158 sec and decreasing the anodic oxidation current up to 2.5 mA/cm$^2$ every 4 sec in the middle of the above period of 158 sec is performed twice. Finally, the anodic oxidation current becomes 100 mA/cm$^2$.

The PS layer (3) has a thickness of approx. 10 $\mu$m. In the PS layer (3), there is a structure in which dense low-porosity silicon layers having a thickness of approx. 8 nm are periodically arranged. Each of these dense layers respectively has a function of forming an equal-potential plane and correcting the field distribution in the layer and moreover functions as a heat sink for sinking Joule heat generated in the layer and has a function of stabilizing a diode current.

Alq$_3$ (4) is vacuum-deposited on the surface of the formed PS layer (3) as an organic phosphor. Moreover, a circular Au thin film (5) having a thickness of 12 nm and a diameter of 6 mm is vacuum-deposited on the Alq$_3$ (4). By using the Au thin film (5) as a surface-side electrode, a diode is formed between the surface-side electrode and the back-side ohmic electrode (1).

Figure 3:
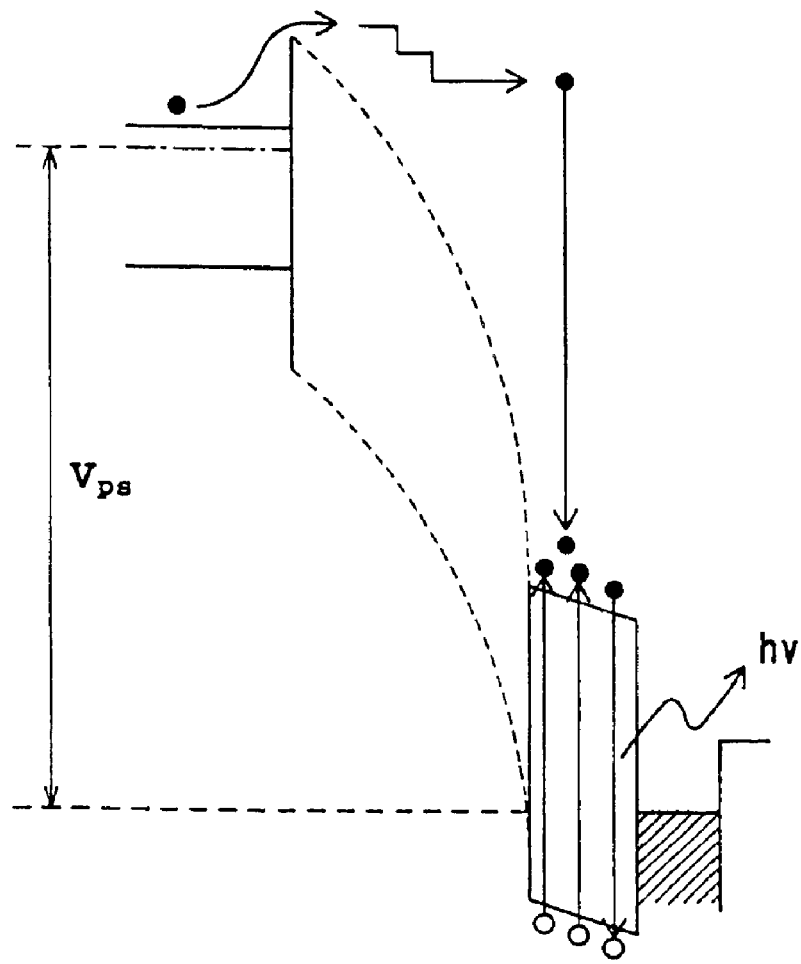
FIG. 3 is a schematic view showing a diagram of energy bands relating to generation of ballistic electrons in a PS layer of a ballistic-electron-exciting solid-state light-emitting device fabricated for an example of the invention of the present application and emission due to phosphor excitation.

A positive voltage V$_{ps}$ is applied to the electrode side of the Au thin film (5) of the diode to inject electrons to the PS layer (3) from the n-type silicon substrate (2). The injected electrons become ballistic in accordance with the above multiple-tunnel effect to generate holes on the Alq$_3$ layer through collision excitation as shown in FIG. 3. As a result, light is emitted due to recombination of electrons and holes.

Figure 4:
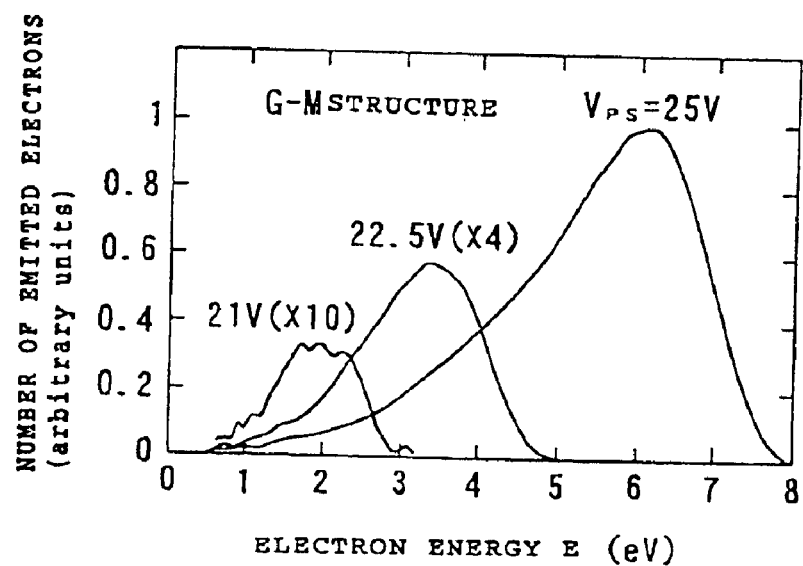
FIG. 4 is a graph showing a result of measuring an energy distribution of electrons emitted through an Au thin film when operating a diode free from $Alq_3$ thin film in a vacuum.

FIG. 4 shows a result of measuring energy distributions of electrons emitted through an Au thin film when operating a diode having no Alq$_3$ thin film in a vacuum. From FIG. 4, it is found that the loss due to scattering are hardly produced while electrons travel in the PS layer and electrons become ballistic.

Figure 5:
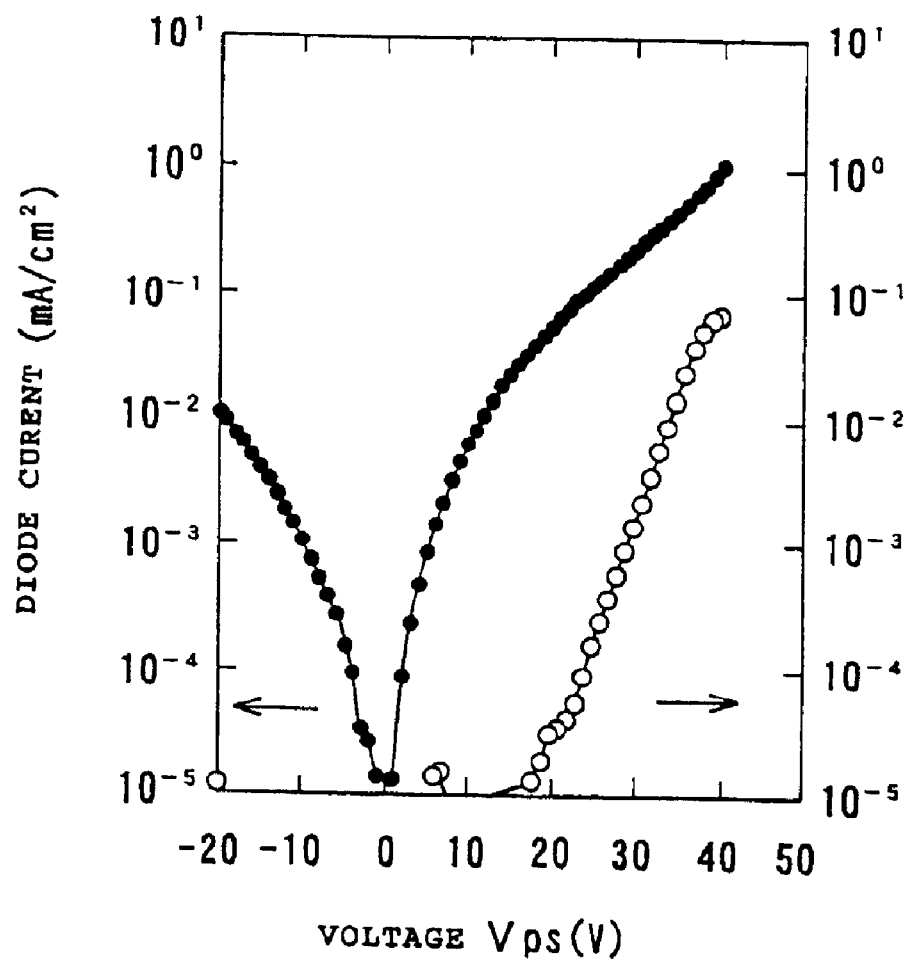
FIG. 5 is a graph showing a result of measuring a current-voltage characteristic (black circles) and an emission intensity-voltage characteristic (white circles) of a ballistic-electron-exciting solid-state light-emitting device fabricated in example 1 of the present invention.

FIG. 5 shows a result of measuring the current-voltage characteristic (black circles) and emission intensity-voltage characteristic (white circles) of a fabricated ballistic-electron-exciting solid-state light-emitting device. It is found that uniform green light emission occurs when an applied voltage is approx. 1.5 V (diode current of approx. 0.05 A/cm$^2$) and the emission intensity rapidly increases by raising the voltage.

Figure 6:
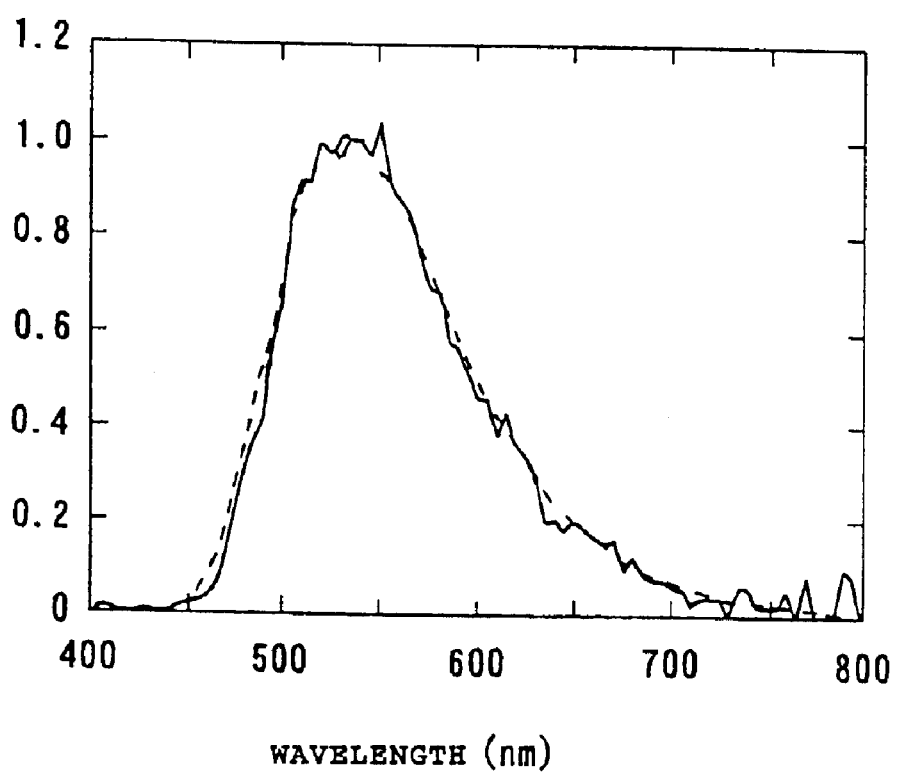
FIG. 6 is a graph showing a spectrum of emission by a ballistic-electron-exciting solid-state light-emitting device fabricated in the example 1 of the invention of the present application and a spectrum of photoluminescence of $Alq_3$ measured through ultraviolet excitation.

To confirm that light is emitted from Alq$_3$, a result of measuring an emission spectrum is shown by a solid line in FIG. 6. A curve is obtained which almost coincides with the spectrum of photoluminescence of Alq$_3$ separately measured by ultraviolet excitation shown by a broken line in FIG. 6. Thus, it is confirmed that the emission results from Alq$_3$. Moreover, it is found that the emission spectrum does not depend on an applied voltage or current and an emission spectrum inherent in Alq$_3$ is always obtained.

Moreover, as a result of a comparison experiment using a diode having a structure in which no ballistic electron is generated in a PS layer, no light is emitted from the diode even if an applied voltage is indefinitely raised. Therefore, it is estimated that ballistic electrons produced in the PS layer of a fabricated thin light-emitting display device excite the phosphor on the surface of the layer and the light having a wavelength inherent in the phosphor is emitted.

Example 2

Another ballistic-electron-exciting solid-state light-emitting device of the invention of the present application is fabricated to study the basic characteristic.

The example 2 uses the n-type silicon substrate (2) constituted as shown in FIG. 1 as a p-type silicon substrate. Specifically, a PS layer (3) is formed by applying anodic oxidation to the surface of a p-type silicon substrate (resistivity: approx. 0.2 $\Omega$cm) which has an orientation (100) and on whose back an ohmic electrode (1) is formed in a solution obtained by mixing an HF aqueous solution (55 wt %) and C$_2$H$_5$OH at a ratio of 1:1 under a darkroom state and moreover applying quick thermal oxidation at 900° C. for 15 min. In the case of the anodic oxidation, a cycle of an anodic oxidation current of 5 mA/cm$^2$ and an anodic oxidation time of 6 sec and a cycle of an anodic oxidation current of 100 MA/cm$^2$ and an anodic oxidation time of 15 sec are alternately repeated three times.

Alq$_3$ (4) serving as an organic phosphor is vacuum-deposited on the surface of the formed PS layer (3) and moreover, an Au thin film (5) serving as a translucent electrode is vacuum-deposited on the Alq$_3$. The PS layer (3), Alq$_3$ (4), and Au thin film (5) have thicknesses of approx. 8 $\mu$m, approx. 100 nm, and approx. 10 nm respectively.

Figure 7:
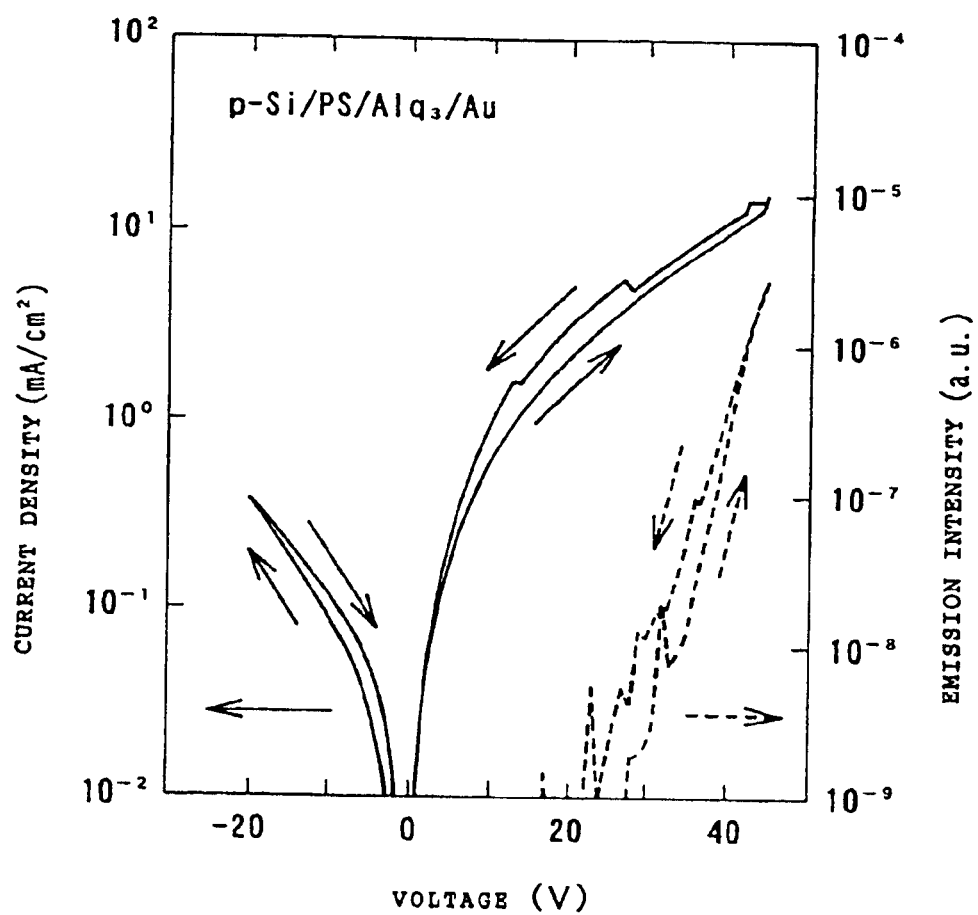
FIG. 7 is a graph showing a result of measuring a current-voltage characteristic (solid line) and an emission intensity-voltage characteristic (dotted line) of a ballistic-electron-exciting solid-state light-emitting device fabricated in example 2 of the invention of the present application.

FIG. 7 shows a result of measuring the current-voltage characteristic (solid line) and emission intensity-voltage characteristic (broken line) of the fabricated ballistic-electron-exciting solid-state light-emitting device, in which uniform light emission is observed the same as the case of the example 1.

Example 3

Still another ballistic-electron-exciting solid-state light-emitting device of the invention of the present application is fabricated to study the basic characteristic.

The example 3 uses the PS layer (3) constituted as shown in FIG. 1 as a nano-cyrstallized polysilicon film. Specifically, an n$^+$-type polysilicon film (thickness of 5 $\mu$m) is first formed on the surface of an n-type silicon substrate (resistivity: 0.005 to 0.0018 $\Omega$cm) which has an orientation (100) and on whose back an ohmic electrode (1) is formed. Then, a porous polysilicon (PPS) film is formed by applying anodic oxidation up to almost the half depth of the n$^+$-type polysilicon film in a solution obtained by mixing an HF aqueous solution (55 wt %) and C$_2$H$_5$OH at a ratio of 1:1 under irradiation by a tungsten lamp and moreover applying electrochemical oxidation to the silicon film in a 1NH$_2$SO$_4$ solution under a darkroom state. In the case of the anodic oxidation, a cycle of an anodic oxidation current of 5 mA/cm$^2$ and an anodic oxidation time of 6 sec and a cycle of an anodic oxidation current of 100 mA/cm$^2$ and an anodic oxidation time of 15 sec are alternately repeated three times. The electrochemical oxidation uses an oxidation current of 3 mA/cm$^2$ and an oxidation time of 200 sec.

Alq$_3$ (4) serving as an organic phosphor is vacuum-deposited on the surface of the formed PPS film and moreover, an Au thin film (5) serving as a translucent electrode is vacuum-deposited on the Alq$_3$ (4). The PPS film, Alq$_3$ (4), and Au thin film (5) have thicknesses of approx. 2.5$\mu$, approx. 120 nm, and approx. 10 nm respectively.

Figure 8:
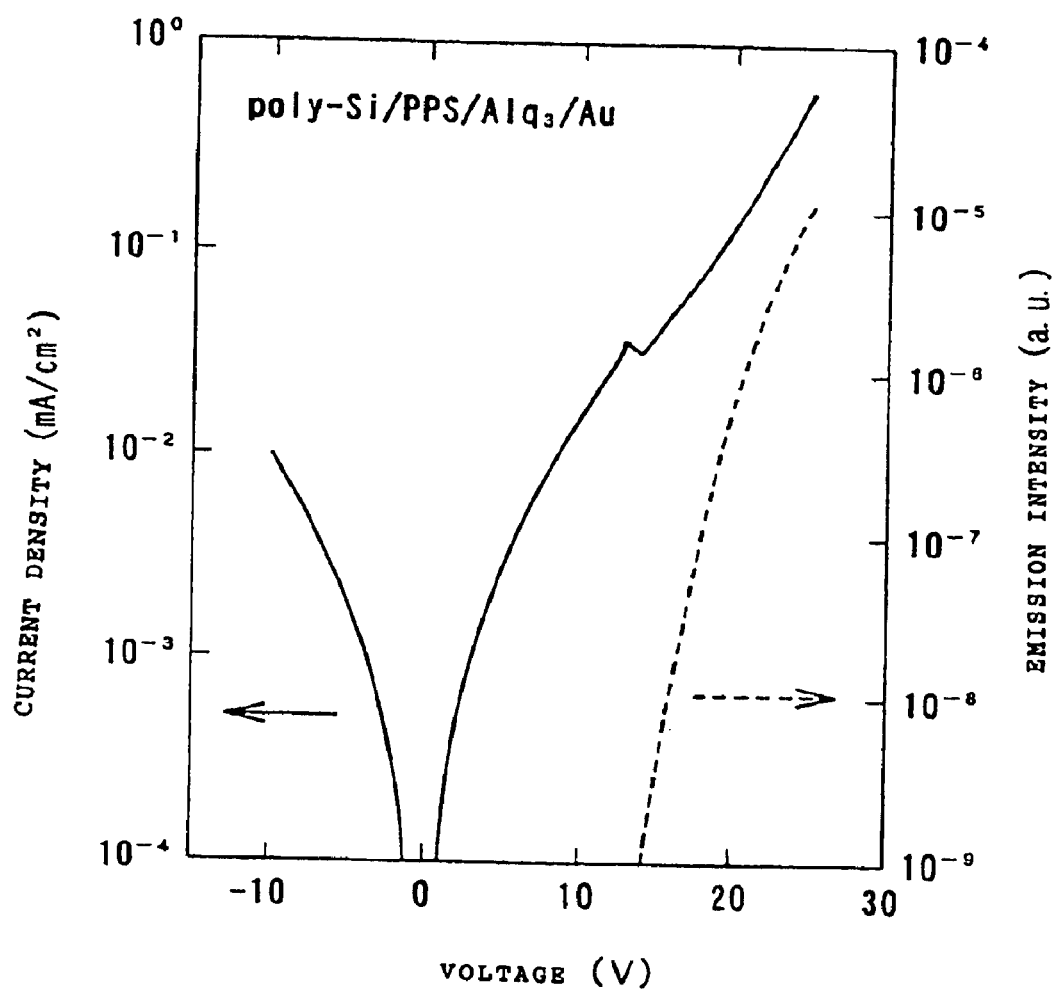
FIG. 8 is a graph showing a result of measuring a current-voltage characteristic (solid line) and an emission intensity-voltage characteristic (dotted line) of a ballistic-electron-exciting solid-state light-emitting device fabricated in example 3 of the invention of the present application.

FIG. 8 shows a result of measuring the current-voltage characteristic (solid line) and emission intensity-voltage characteristic (dotted line) of the fabricated ballistic-electron-exciting solid-state light-emitting device, in which uniform light emission is observed the same as the case of each of the above examples.

Example 4

Still another ballistic-electron-exciting solid-state light-emitting device of the invention of the present application is fabricated to study the basic characteristic.

The example 4 uses Alq$_3$ (4) serving as the phosphor constituted as shown in FIG. 1 as an inorganic-material thin film of ZnS:Mn. Specifically, a PS layer (3) is formed by applying anodic oxidation to the surface of an n-type silicon substrate (resistivity: 0.005 to 0.0018 Ωcm) which has an orientation (100) and on whose back an ohmic electrode (1) is formed in a solution obtained by mixing an HF aqueous solution (55 wt %) and $C_2H_5OH$ at a ratio of 1:1 under irradiation by a tungsten lamp the same as the case of the example 1. In this case, as shown in FIG. 2, the anodic oxidation current is slowly increased up to 0 to 100 mA/cm$^2$ for the total of approx. 3 min and in the middle of the above period, the anodic oxidation current is decreased up to 2.5 mA/cm$^2$ every 4 sec twice.

ZnS:Mn serving as an inorganic phosphor is vacuum-deposited on the surface of the formed PS layer (3) and moreover, an Au thin film (5) serving as a translucent electrode is vacuum-deposited on the ZnS:Mn. The PS layer (3), Zn:Mn thin film, and Au thin film (5) have thicknesses of approx. 10 μm, approx. 140 nm, and approx. 10 nm respectively.

Figure 9:
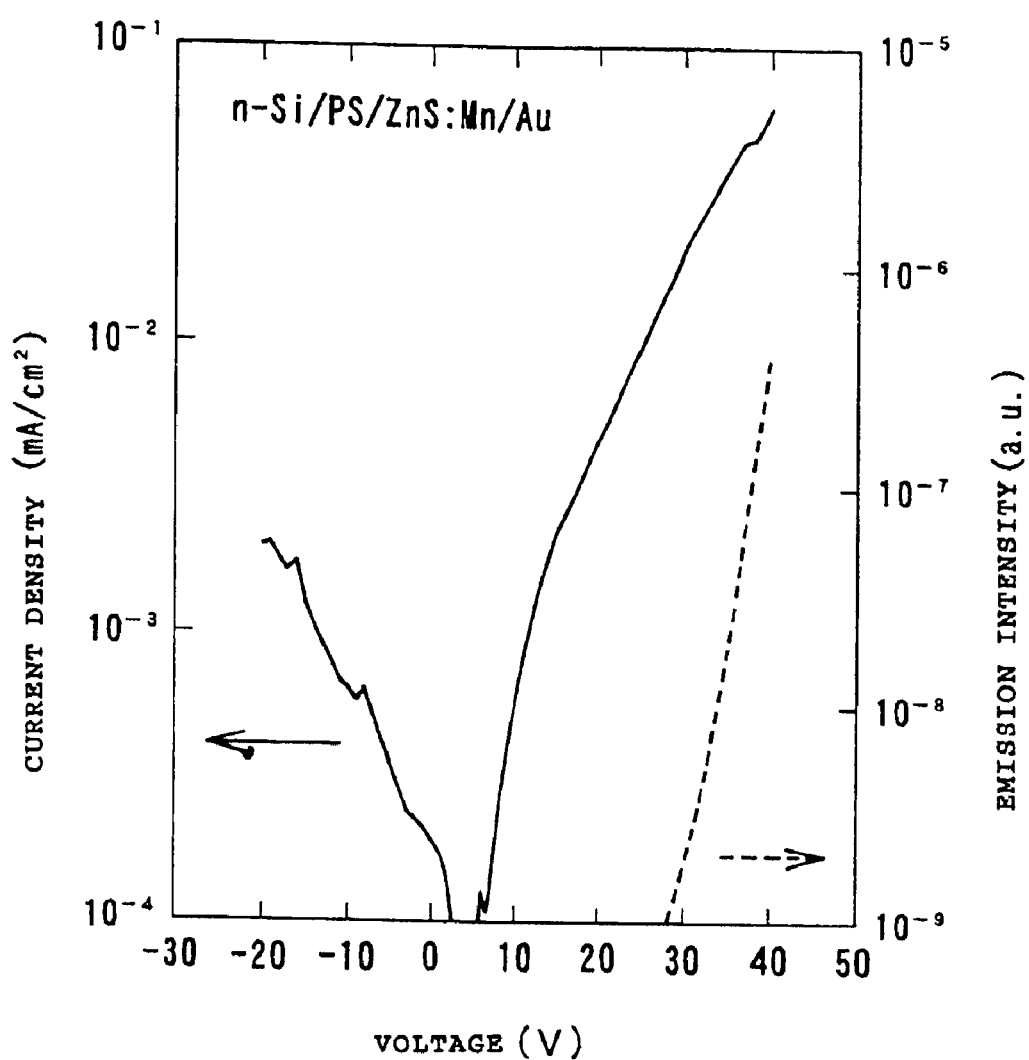
FIG. 9 is a graph showing a result of measuring a current-voltage characteristic (solid line) and an emission intensity-voltage characteristic (dotted line) of a ballistic-electron-exciting solid-state light-emitting device fabricated in example 4 of the invention of the present application.

FIG. 9 shows a result of measuring the current-voltage characteristic (solid line) and emission intensity-voltage characteristic (dotted line) of the fabricated ballistic-electron-exciting solid-state light-emitting device, in which uniform light emission is observed the same as the case of each of the above examples.

INDUSTRIAL APPLICABILITY

As described above in detail, the invention of the present application provides a method for generating ballistic electrons at a high controllability and a semiconductor device for the method provided with a practical material configuration. A ballistic-electron-exciting solid-state semiconductor device of the invention of the present application does not require a complex fabrication process but the semiconductor device makes it possible to develop a completely new thin planar display by using the semiconductor device as a light-emitting device. Moreover, it is considered that the present invention contributes to development of a new semiconductor device such as an advanced functional optoelectronic device. Because the applicable range of the invention of the present application is very wide, it is expected to practically use the present invention.

What is claimed is:

1. A ballistic-electron generating method comprising:
   forming a polycrystalline semiconductor film on a semiconductor substrate;
   applying anodic oxidation under a light irradiating environment where the light reaches to the half depth of the polycrystalline semiconductor film and electrochemical oxidation in a darkroom environment to the semiconductor substrate in order to form a nanostructure microcrystal layer or semi-insulating layer of semiconductor, wherein a first cycle of the anodic oxidation with a first predetermined anodic oxidation current density and first anodic oxidation time and a second cycle of the anodic oxidation with a second predetermined anodic oxidation current density and second anodic oxidation time are alternately repeated a predetermined number of times and the electrochemical oxidation is applied after the predetermined number of times of alternate repetition of the anodic oxidation; and
   applying an electric field to the nanostructure microcrystal layer or semi-insulating layer in order to cause a multiple-tunnel effect, thereby generating ballistic electrons or quasiballistic electrons.

2. The ballistic-electron generating method according to claim 1, wherein said applying anodic oxidation under a light irradiating environment where the light reaches to the half depth of the polycrystalline semiconductor film and electrochemical oxidation in a darkroom environment to the semiconductor substrate in order to form a nanostructure microcrystal layer or semi-insulating layer of semiconductor forms the nanostructure microcrystal layer or semi-insulating layer so as to have an interface oxide film therein.

3. The ballistic-electron generating method according to claim 1, wherein said applying anodic oxidation under a light irradiating environment where the light reaches to the half depth of the polycrystalline semiconductor film and electrochemical oxidation in a darkroom environment to the semiconductor substrate in order to form a nanostructure microcrystal layer or semi-insulating layer of semiconductor forms the nanostructure microcrystal layer or semi-insulating layer as a porous layer.

* * * * *